(12) United States Patent
Lucas-Nuelle

(10) Patent No.: US 10,787,138 B2
(45) Date of Patent: Sep. 29, 2020

(54) FRONT BUMPER ARRANGEMENT SUPPORT STRUCTURE FOR A VEHICLE

(71) Applicant: FORD GLOBAL TECHNOLOGIES, LLC, Dearborn, MI (US)

(72) Inventor: Peter Lucas-Nuelle, Ratingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 16/209,328

(22) Filed: Dec. 4, 2018

(65) Prior Publication Data

US 2019/0176732 A1    Jun. 13, 2019

(30) Foreign Application Priority Data

Dec. 8, 2017    (DE) .................. 10 2017 222 321

(51) Int. Cl.
*B60R 19/18* (2006.01)
*B60R 19/34* (2006.01)

(52) U.S. Cl.
CPC .............. *B60R 19/18* (2013.01); *B60R 19/34* (2013.01); *B60R 2019/186* (2013.01); *B60R 2019/1886* (2013.01)

(58) Field of Classification Search
CPC ....... B60R 19/02; B60R 19/023; B60R 19/12; B60R 19/18; B60R 19/21; B60R 19/34
USPC .................. 296/114, 126, 132, 133
See application file for complete search history.

(56) References Cited

U.S. PATENT DOCUMENTS

| | | | |
|---|---|---|---|
| 3,840,259 A | 10/1974 | Barenyi | |
| 7,407,206 B2 | 8/2008 | Arns et al. | |
| 7,699,383 B2 | 4/2010 | Fukukawa et al. | |
| 7,854,454 B2 * | 12/2010 | Yang | B60R 19/023 293/155 |
| 8,414,041 B2 * | 4/2013 | Paare | B60R 19/18 293/154 |
| 9,821,740 B2 * | 11/2017 | Jordan | B60R 19/24 |
| 10,562,475 B2 * | 2/2020 | Fujii | B60R 19/24 |

(Continued)

FOREIGN PATENT DOCUMENTS

| | | |
|---|---|---|
| DE | 102013012479 A1 | 1/2015 |
| JP | 201649812 A | 4/2016 |

OTHER PUBLICATIONS

English Machine Translation for DE102013012479A1 dated Jan. 9, 2015.

(Continued)

*Primary Examiner* — Jason S Daniels
(74) *Attorney, Agent, or Firm* — David Coppiellie; King & Schickli, PLLC

(57) ABSTRACT

A front bumper arrangement support structure for a motor vehicle includes a crossmember having a front end region that extends substantially transversely to the vehicle longitudinal direction, a fastening plate located to the rear of the crossmember and at least one deformation element that extends between the front end region of the crossmember and the fastening plate. Here, an integrated bumper element is provided. The bumper element extends in an arcuate manner between the front end region of the crossmember and the fastening plate and protrudes to the front or forward relative to the crossmember. The integrated bumper element, the deformation element and the fastening plate form an approximately triangular structure.

18 Claims, 2 Drawing Sheets

(56) References Cited

U.S. PATENT DOCUMENTS

| | | | |
|---|---|---|---|
| 2002/0000729 A1* | 1/2002 | Phillips | B60R 19/56 |
| | | | 293/142 |
| 2014/0008924 A1* | 1/2014 | Han | B60R 19/18 |
| | | | 293/133 |
| 2016/0059810 A1* | 3/2016 | Watanabe | B60R 19/24 |
| | | | 293/133 |

OTHER PUBLICATIONS

English Machine Translation for JP201649812A dated Apr. 11, 2016.

Office Action dated Oct. 12, 2018 for App Ser No. DE102017223321.9 filed Dec. 8, 2017.

* cited by examiner

FRONT BUMPER ARRANGEMENT SUPPORT STRUCTURE FOR A VEHICLE

This application claims the benefit of German patent application serial no. 102017222321.9, filed on 8 Dec. 2017, the full disclosure of which is incorporated herein by reference.

TECHNICAL FIELD

This document relates to a front bumper arrangement support structure for a vehicle, in particular a motor vehicle as well as to a motor vehicle comprising such a front bumper arrangement support structure.

BACKGROUND

The front bumpers of current motor vehicles generally consist substantially of a support structure which is connected to the bodywork, an adapted apron-like plastics element which forms the actual external skin of the bumper being folded thereover.

Current bumper arrangements in motor vehicles in the passenger motor vehicle sector have to meet various legislative and other standard commercial requirements with regard to crash behavior. The side regions of the front bumper, in particular, have to meet the following requirements:
a) the headlamps should not be damaged by a so-called pendulum impact at low speeds;
b) in the event of a front impact with an oncoming vehicle or a solid obstacle, in each case with a small overlap (by way of example the SORB Small Offset Rigid Barrier impact mode might be mentioned here) the vehicle structure is intended to be reinforced such that the vehicle is laterally diverted from the obstacle and during this process as much impact energy as possible is converted into deformation energy; and
c) in the event of a pedestrian impact the external skin is intended to be able to be deformed to the rear, at least in the central vehicle region, in order to dissipate in a controlled manner the energy introduced by the leg impact. To this end, the support structure has to be designed in terms of geometry such that in this region a spacing is maintained from the external skin.

In the past, these technically very different requirements led to relatively costly constructions. An example thereof from the company of the Applicant is shown schematically in FIG. 4 in plan view.

FIG. 4 shows the left-hand lateral region of the support structure of a front bumper; the plastics cladding folded thereover is not shown. The other half (also not shown) is intended to be designed substantially mirror-symmetrically. The forward direction of travel is identified by an arrow 34.

A crossmember 12' is connected to a fastening plate 18' by means of a deformation element 16' which is a so-called "crash can" (axial compressible body). In order to ensure the safety of pedestrians according to requirement c), the plastics cladding (not shown) is spaced apart from the crossmember. For protecting the headlamp which is located approximately in the region of the deformation element 16' (and/or optionally protrudes outwardly thereover) in the prior art according to FIG. 4 a dedicated so-called catcher 40 is provided which is connected toward the front to the crossmember 12' and in this region reduces and/or eliminates the free space between the plastics cladding and the crossmember 12'.

In the event of an action of force in this region the catcher 40 absorbs the force and forwards this force substantially onto the deformation element 16' so that a headlamp is protected as far as possible.

The crossmember 12' extends at its outer ends—substantially following the bodywork contour—in an arcuate manner to the rear. In order to ensure a sufficient absorption and/or deflection of the forces in the case of a SORB or a comparable impact scenario—see the aforementioned case b)—an additional deformation element 42 which also is configured as a "crash can" is provided. This deformation element 42 supports the front end region of the crossmember 12' on the fastening plate 18' in the case of a SORB crash or a comparable impact scenario and forwards the impact forces in a desired manner and/or absorbs these forces by axial deformation since the crossmember 12' would otherwise be deformed too easily and the desired path deviation would otherwise not occur.

Thus the support structure shown in FIG. 4 according to the prior art requires the dedicated elements 40 and 42 in order to ensure the aforementioned requirements a) and b). In the company of the Applicant arrangements also exist for comparable purposes, in which further deformation elements are provided in addition to the deformation element 42 in order to meet the aforementioned requirements.

For the general prior art for front bumper arrangements and deformation elements, reference is made by way of example to U.S. Pat. Nos. 3,840,259A, 7,407,206B2 and 7,699,383B2.

SUMMARY

The object hereof is to provide a front bumper arrangement support structure and a motor vehicle comprising such a structure in which the aforementioned requirements may be fulfilled by means of a considerably simplified construction, whereby costs may be lowered due to the elimination of components and the reduction of assembly processes, weight may be saved and the complexity of the construction may be reduced as a whole.

The solution of the aforementioned object is achieved by means of a front bumper arrangement support structure having the features of the following claims.

Accordingly, a front bumper arrangement support structure for a motor vehicle is provided, wherein the arrangement in the two outer regions in each case comprises a crossmember having in each case a front end region extending substantially transversely to the vehicle longitudinal direction and in each case a fastening plate located to the rear of the crossmember and in each case at least one deformation element which extends between the front end region of the crossmember and the fastening plate.

The bumper arrangement support structure comprises, in particular, an integrated bumper element which extends in an arcuate manner between the front end region of the crossmember and the fastening plate and which protrudes to the front relative to the crossmember.

Preferably, the integrated bumper element, deformation element and fastening plate form an approximately triangular structure conceived approximately in plan view, wherein due to the generally rounded shape of the integrated bumper element—corresponding to the bodywork path at this point—generally an ideal triangle is not present but a shape which in plan view varies between an approximately right-angled triangle (the approximate right-angle is thus present between the fastening plate and the deformation element) and a quadrant segment.

By means of this construction—and namely without the requirement of a separate component or a plurality of separate components as in the prior art—the risk of a vehicle headlamp element being damaged by a lateral collision of the vehicle relative to the headlamp region may be reduced. Thus the free space required for pedestrian protection between the plastics sleeve and the supporting structure may already be ensured by the crossmember being offset relative to the integrated bumper element. Since the integrated bumper element is only located in the external region in which the requirements for a free space for pedestrian protection do not have to apply—moreover these requirements would in any case not be able to be fulfilled in practice with regard to the headlamps located in this region—the integrated bumper element may be guided directly below the plastics cladding, so that the headlamp protection according to requirement a) and the force deflection in the event of a SORB or in the case of a comparable impact scenario (requirement b) may be inherently ensured without additional components.

With regard to the required free space it is advantageous if the integrated bumper element protrudes to the front by a defined spacing relative to the crossmember. This may be 40 to 80 mm—depending on whether the intermediate space is filled with an energy absorbing foam or remains free. The corresponding spacing has to be ensured according to the corresponding regulations in terms of pedestrian protection.

Moreover, the integrated bumper element is preferably configured in order to absorb and partially deflect forces exerted onto a solid obstacle with a small offset of less than 90° in the case of a SORB impact or a lateral impact. Since the integrated bumper element is attached between the crossmember and the fastening plate, in the case of a SORB impact or a comparable impact scenario, said element is able to divert the forces which are present, without the requirement of additional deformation elements.

Preferably, therefore, in the lateral regions between the base plate, on the one hand, and the crossmember or the integrated bumper element, on the other hand, in each case only a single deformation element is provided, said deformation element preferably also being configured as a "crash can". The region, which is approximately triangular in plan view, may preferably remain free therebetween (i.e. between the fastening plate, the deformation element and the integrated bumper element).

Preferably the integrated bumper element overlaps the front end region of the crossmember at least in an upper partial region.

In this case, the overlapping region between the integrated bumper element and the front end region of the crossmember approximately coincides at least in an upper partial region with the support surface of the deformation element.

BRIEF DESCRIPTION OF THE DRAWING FIGURES

The invention is described in more detail hereinafter with reference to the exemplary embodiment shown in the drawings, in which.

DETAILED DESCRIPTION

Figure 1:
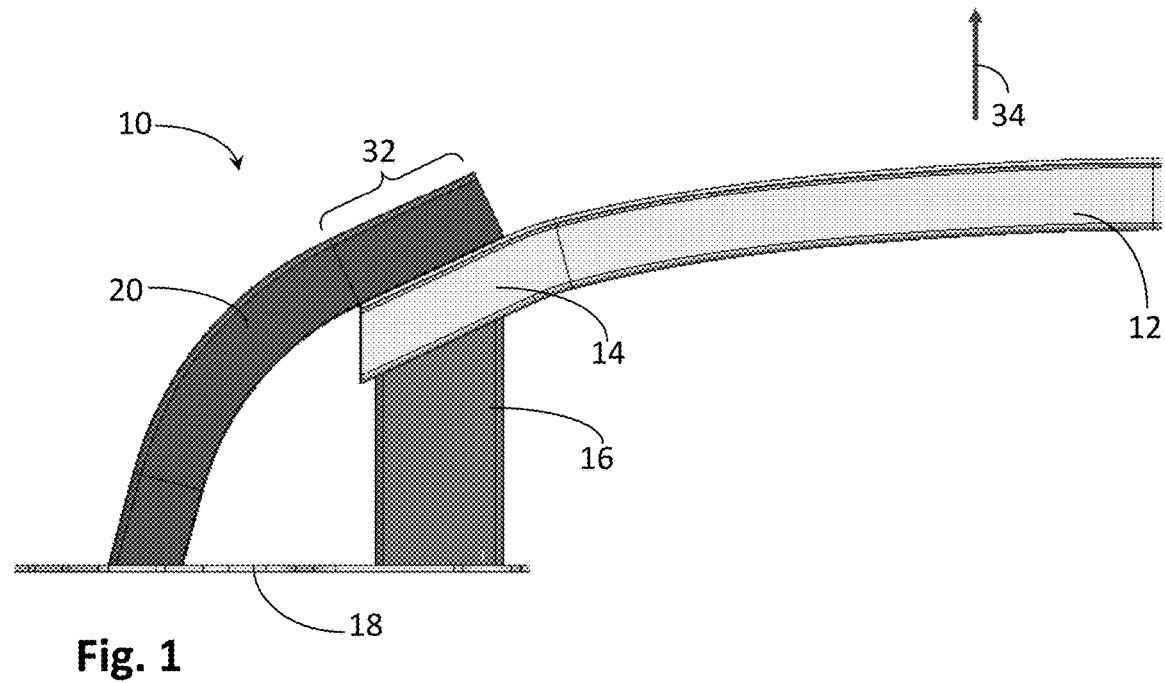
FIG. 1 shows a schematic plan view of the left-hand side region of a front bumper arrangement support structure.
Figure 2:
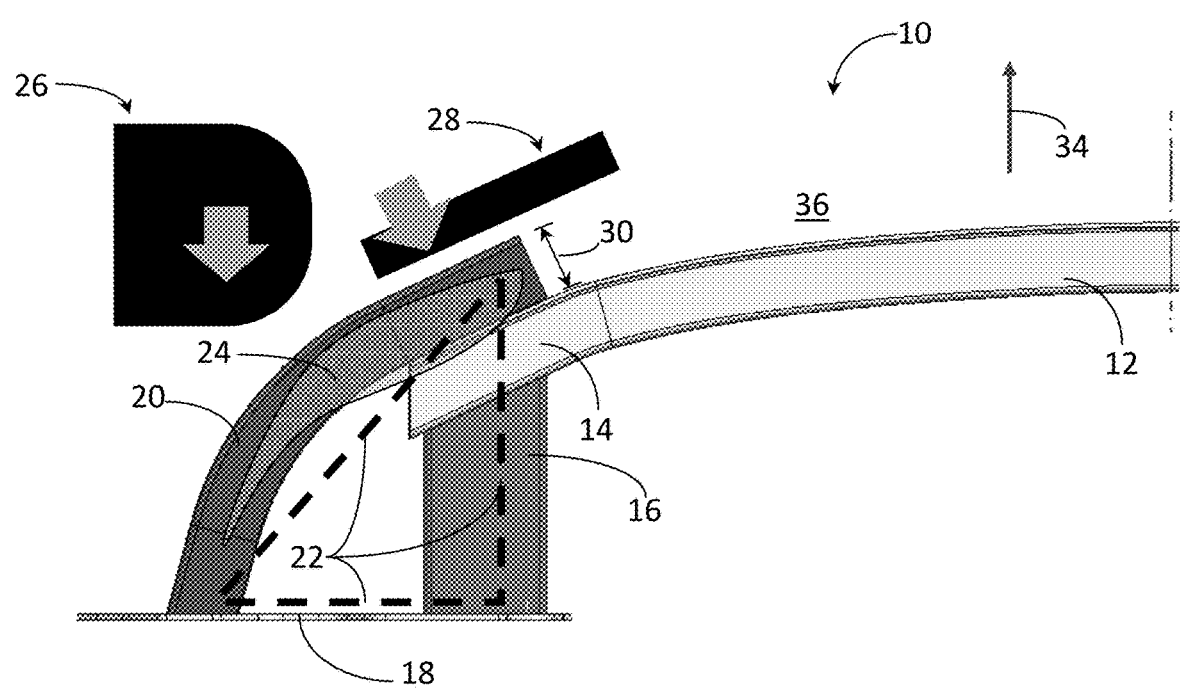
FIG. 2 shows the front bumper arrangement support structure of FIG. 1 with additional details.

The left-hand side region of a front bumper arrangement support structure for a motor vehicle denoted as a whole by 10 is shown in FIGS. 1 and 2, the forward direction of travel thereof being indicated by an arrow 34.

An essential element of the support structure is represented by a crossmember 12 which preferably extends from the left-hand side shown to the right-hand side (not shown) of the support structure 10, wherein the left-hand side and right-hand side are generally configured substantially mirror-symmetrically. Thus the crossmember 12 preferably represents a common element for the left-hand side and right-hand side, whereas the other elements (the elements 14, 16, 18, 20 described further below) for each side are present separately. However, it is also conceivable that the crossmember 12 is configured to be cut off between the two sides so that the crossmember is also divided into two elements.

The crossmember 12 has a left-hand front end region 14 (the right-hand front end region on the opposing side is not shown). The transverse lines which may be identified in the figures in the crossmember 12—as is also the case of the transverse lines in the integrated bumper element 20 described further below—are also present merely for illustrative reasons in order to illustrate differently curved portions and are not intended to have any technical significance within the meaning of the separation into different elements.

The crossmember 12 extends in its front end region 14 curved in a slightly concave manner, wherein the front end region 14 is supported by a deformation element 16 configured as a "crash can" (i.e. a structure designed for axial compression).

The support 20 (including the integrated support 20 described further below) may comprise reinforcing structures, such as for example ribs or hollow chambers, known from the prior art, which are intended to prevent a tendency to deformation and/or compression, whereas the deformation element 16 is deliberately constructed such that in the case of axial loads it converts as much energy as possible into deformation work during the course of an axial compression.

The deformation element 16 is supported in turn on a fastening plate 18 which, for example, may be formed by the front side part of a wheel housing. The fastening plate 18 is oriented substantially transversely to the direction of travel. In this case, the term "fastening plate" is not intended to imply that the corresponding surface has to be necessarily planar. The fastening plate 18 in any case represents the basic mechanical connection with the remaining vehicle bodywork.

The plan view in FIGS. 1 and 2 does not show the vertical staggered arrangement of the individual elements. If within the context of this application a connection or the like of the elements is discussed, this is intended to signify that this is the case at least in a specific upper partial region of the bumper arrangement support structure. However, it is perfectly possible and within the scope of the present disclosure that, for example, the crossmember 12 has a greater vertical extent than the deformation element 16 so that these elements then would only be connected together in an upper partial region of the crossmember 12.

Figure 4:
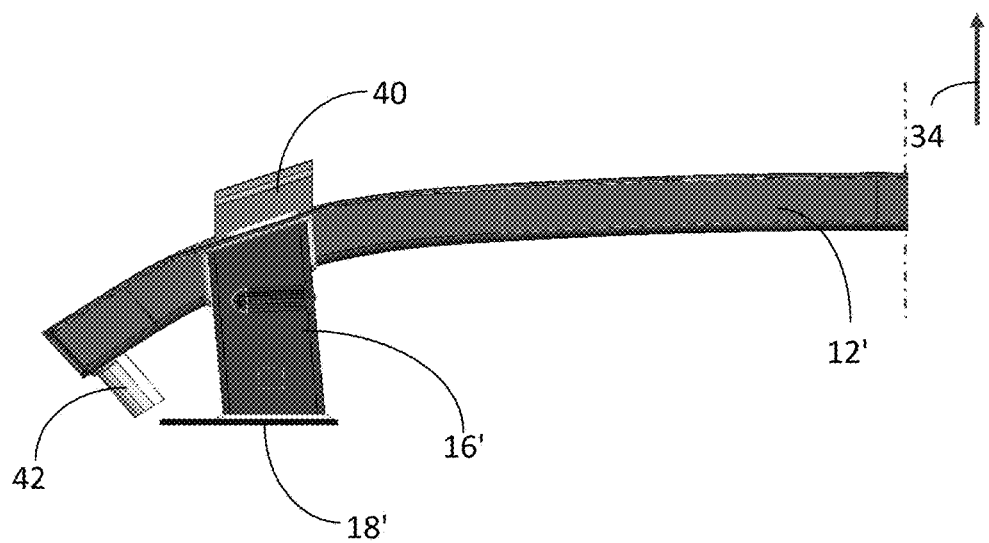
FIG. 4 shows a front bumper arrangement support structure according to the prior art.
Figure 1:
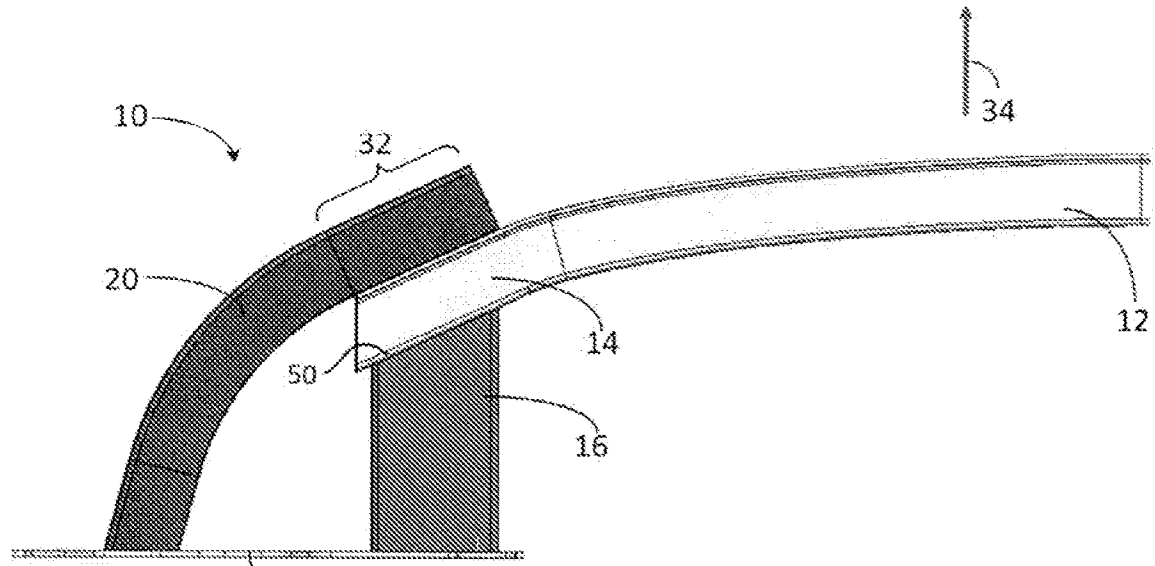
Figure 2:
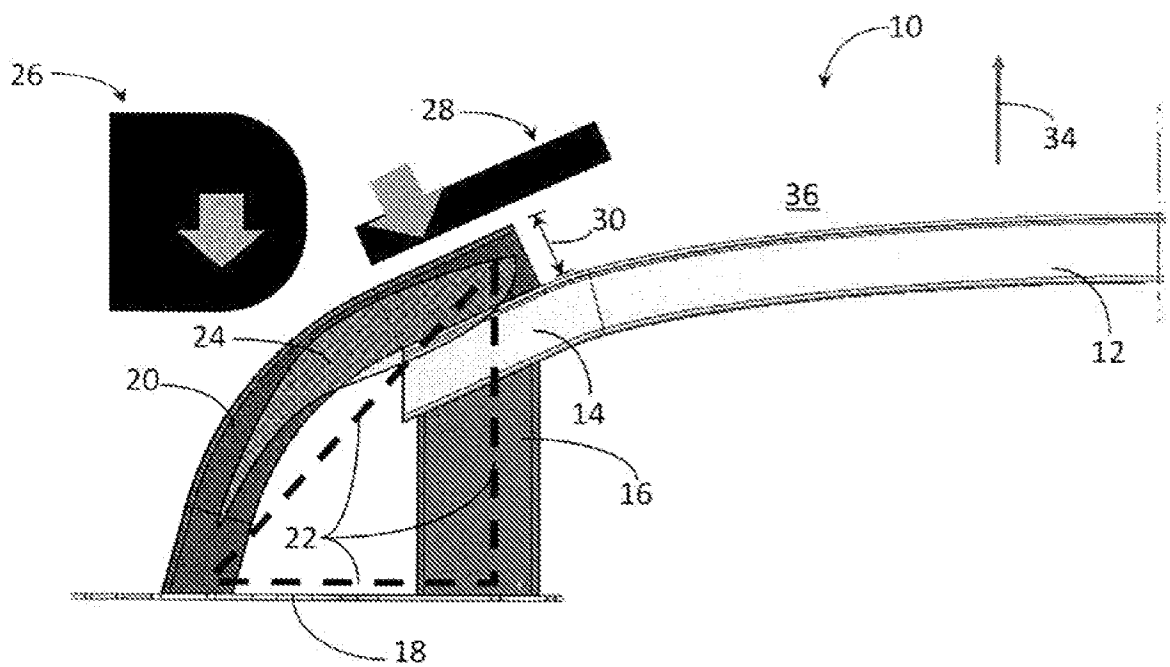

Returning to FIGS. 1 and 2 the crossmember 12—in contrast to the prior art (see FIG. 4 already described above)—does not extend as far as the lateral end of the motor vehicle front region. Instead, an integrated bumper element 20 is arranged on the crossmember 12 on the front end region 14 thereof, said bumper element extending in an arc starting from the crossmember front end region 14 to the fastening plate 18 in a direction facing outwardly and to the rear, and being preferably connected both to the crossmember front end region 14 and to the fastening plate. As a whole, therefore, an approximately triangular or quadrant-shaped structure is produced.

This integrated bumper element 20 is configured in the manner of a profile—preferably similar to the crossmember 12—and due to its stability firstly protects a recessed headlamp element in the plane to the rear of the integrated bumper element 20, the position thereof in FIG. 2 being indicated by the reference numeral 24, from damage in the event of a crash, in particular in the case of the pendulum impact crash test at low speed which is relevant here, see the test body 28 indicated in FIG. 2 which strikes the bumper in the region of the headlamp 24 at a crash angle of ca. 30° in the direction of the arrow.

On the other side of the headlamp 24 toward the interior, an offset is produced by the transition from the integrated bumper element 20 to the crossmember 12 so that a plastics sleeve (not shown) positioned thereon in this region 36 (FIG. 2) has a free space required for pedestrian protection. The corresponding offset depth 30 is dictated by the current crash standards, for example this depth is 40 mm to 80 mm or even only 8 mm. In any case, the formation of an internal bumper element 20 is beneficial for forming a free space serving for pedestrian protection and at the same time represents a simple and cost-effective design.

Overall, in the arrangement described above an imaginary triangle 22 may be described, the interior thereof—in contrast to known constructions according to the prior art—remaining free or substantially free.

At the same time, without additional deformation structures, the structure is also suitable for partially absorbing a SORB impact or an impact in the case of a comparable impact scenario and to deflect the vehicle expediently from the obstacle as indicated by the test obstacle denoted in FIG. 2 by 26.

The crossmember front end region 14 and the integrated bumper element 20 overlap one another according to FIGS. 1 and 2 in an overlapping region 32 (FIG. 1) which also coincides or corresponds approximately to the support surface 50 of the deformation element 16. In this region 32 the elements 16, 14 and 20 may be reliably connected by known joining methods such as welding.

Figure 3:
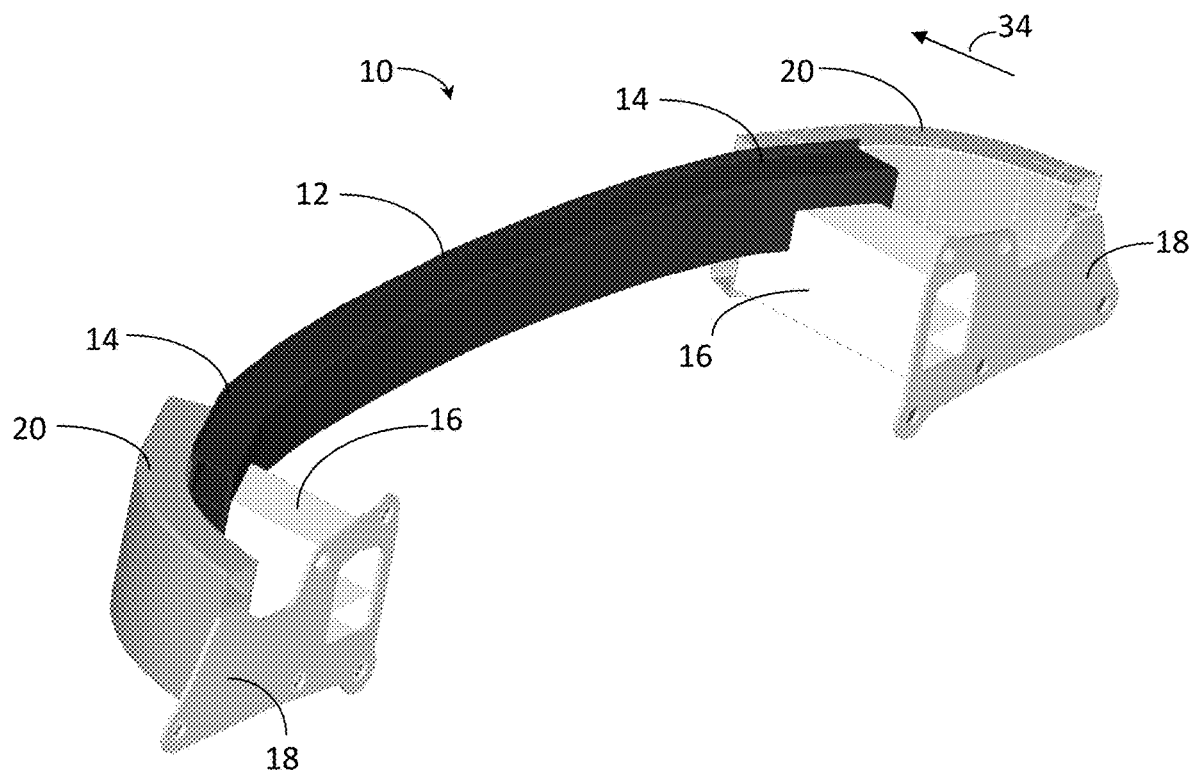
FIG. 3 shows a schematic perspective view of an exemplary embodiment of a front bumper arrangement support structure.

In FIG. 3 a perspective view of an exemplary embodiment of a front bumper arrangement support structure is shown. As may be seen, the deformation element 16 adjoins the crossmember 12 only in an upper partial region, and in the lower region this deformation element extends directly as far as the integrated bumper element 20. The integrated bumper element 20 also has a greater vertical extent (approximately double the size) than the crossmember 12.

While only one outer region or end of the front bumper arrangement support structure is shown in FIGS. 1-3, it should be appreciated that a mirror image structural arrangement is provided at the second, opposite outer region or end of the front bumper arrangement. Thus the second outer region includes a second fastening plate, at least one second deformation element and a second integrated bumper element extending in an arcuate manner between the front end region of the crossmember and the second fastening plate and protruding forward from the crossmember. The second integrated bumper element, the second fastening plate and the second at least one deformation element form a second approximately triangular structure.

What is claimed:

1. A front bumper arrangement support structure for a motor vehicle comprising:
   at a first outer region, a crossmember having a front end region and extending substantially transversely to a vehicle longitudinal direction,
   a fastening plate located to a rear of the crossmember and at least one deformation element extending between the front end region of the crossmember and the fastening plate, characterized by an integrated bumper element that extends in an arcuate manner between the front end region of the crossmember and the fastening plate and that protrudes forward relative to the crossmember wherein the integrated bumper element overlaps the front end region of the crossmember at least in an upper partial region and an overlapping region between the integrated bumper element and the front end region of the crossmember coincides at least in the upper partial region with a support surface of the deformation element.

2. The front bumper arrangement support structure as claimed in claim 1, wherein the integrated bumper element, the at least one deformation element and the fastening plate form an approximately triangular structure.

3. The front bumper arrangement support structure as claimed in claim 2, wherein the integrated bumper element is arranged to reduce a risk of a vehicle headlamp element being damaged by a lateral collision relating to a headlamp region.

4. The front bumper arrangement support structure as claimed in claim 3, wherein the integrated bumper element protrudes forward by a defined spacing relative to the crossmember.

5. The front bumper arrangement support structure as claimed in claim 4, wherein the integrated bumper element is configured in order to absorb and partially deflect forces exerted onto a solid obstacle with a small offset, during a SORB impact or a lateral impact.

6. The front bumper arrangement support structure as claimed in claim 5, wherein the deformation element is configured as a crash can.

7. The front bumper arrangement support structure as claimed in claim 6, wherein in lateral regions between the fastening plate and the crossmember or the integrated bumper element, only a single deformation element is provided.

8. The front bumper arrangement support structure of claim 1, comprising at a second outer region having a second fastening plate located to the rear of the crossmember and at least one second deformation element extending between a second front end region of the crossmember and the second fastening plate, characterized by a second integrated bumper element that extends between the front end region of the crossmember and the second fastening plate and that protrudes forward relative to the crossmember.

9. The front bumper arrangement support structure of claim 8, wherein the second integrated bumper element, the second at least one deformation element and the second fastening plate form a second approximately triangular structure.

10. The front bumper arrangement support structure of claim 9, wherein the second integrated bumper element overlaps the front end region of the crossmember at least in a second upper partial region.

11. The front bumper arrangement support structure of claim 10, wherein a second overlapping region between the second integrated bumper element and the front end region of the crossmember approximately coincides at least in said second upper partial region with a second support surface of said second deformation element.

12. The front bumper arrangement support structure of claim 11, wherein the second integrated bumper element is arranged to reduce risk of a second vehicle headlamp element being damaged by a lateral collision relating to a second headlamp region.

13. The front bumper arrangement support structure of claim 12, wherein the second integrated bumper element protrudes forward by a second defined spacing relative to the crossmember.

14. The front bumper arrangement support structure of claim 13, wherein the second integrated bumper element is configured in order to absorb and partially deflect forces exerted onto an obstacle with an offset during a SORB impact or a lateral impact.

15. The front bumper arrangement support structure of claim 14, wherein the second deformation element is configured as a crash can.

16. The front bumper arrangement support structure of claim 15, wherein in lateral regions between the second fastening plate and the crossmember or the second integrated bumper element only a single second deformation element is provided.

17. A motor vehicle, having a front bumper arrangement support structure as set forth in claim 8, wherein the front bumper arrangement support structure is surrounded by a bumper sleeve.

18. The front bumper arrangement support structure of claim 1 wherein the overlapping region is aligned with the support surface along an axis parallel to a forward direction of travel of the motor vehicle.

* * * * *

UNITED STATES PATENT AND TRADEMARK OFFICE
CERTIFICATE OF CORRECTION

PATENT NO. : 10,787,138 B2  
APPLICATION NO. : 16/209328  
DATED : September 29, 2020  
INVENTOR(S) : Peter Lucas-Nuelle Page 1 of 2

It is certified that error appears in the above-identified patent and that said Letters Patent is hereby corrected as shown below:

In the Drawings

Please replace Drawing Sheet 1 of 2, for Figure 1, as shown on attached page.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*